United States Patent Office 3,235,459
Patented Feb. 15, 1966

3,235,459
ORAL COMPOSITIONS FOR CARIES PROPHYLAXIS
Marion D. Francis, Cincinnati, Ohio, assignor to The Procter & Gamble Company, Cincinnati, Ohio, a corporation of Ohio
No Drawing. Filed Feb. 15, 1962, Ser. No. 173,376
5 Claims. (Cl. 167—93)

This invention relates to improved oral compositions for caries prophylaxis. More particularly, it relates to oral compositions containing low molecular weight N-alkylol quaternary ammonium fluorides as anticaries agents.

By the term "oral composition" is meant a product which in the ordinary course of usage would not be ingested, but would be retained in the oral cavity for a time sufficient to contact the dental surfaces. Such products include, for example, dentifrices, mouthwash, dental prophylaxis pastes and topical solutions.

The efficacy of stannous and sodium fluoride in caries prophylaxis is well established. Topical application of solutions of stannous fluoride has become a routine procedure in many dental offices and clinics. More recently, a toothpaste containing stannous fluoride has been proven effective against caries in several clinical studies. Sodium fluoride is added to the water supplies of many communities as a result of the recognition by public health officials of the effectiveness of fluorides in caries prevention. Although these inorganic fluorides have proven effective in reducing the incidence of caries under proper usage conditions, both sodium fluoride and stannous fluoride are subject to certain limitations which restrict their practical utility in oral compositions for caries prophylaxis.

Sodium fluoride, for example, has been successfully employed as a source of fluoride for fluoridation of public water supplies, but this fluoride has yielded only slight anti-caries effect when incorporated in dentifrice compositions.

Although stannous fluoride is very effective in reducing the solubility of dental enamel in acid, and thereby inhibits the formation of caries, this compound presents formulation problems when used in oral compositions. Because of the relative instability of the stannous ion, and the peculiar taste which it imparts, care must be taken in formulation of toothpastes, for example, which contain stannous fluoride. Only limited types of abrasives, binders and flavoring materials may be used in conjunction with this compound.

Various organic fluorides have been suggested for use in oral compositions for caries prophylaxis. Although many of these compounds effectively reduce the acid solubility of dental enamel and permit greater flexibility in product formulation, many cause adverse changes in the dental enamel in the course of treatment.

Desirably, an anticaries agent for use in oral compositions for caries prophylaxis will be effective in its primary function (anticaries effect), yet, by virtue of its stability and inoccuous taste, will be adaptable to use in conjunction with a wide variety of the usual functional components and flavoring materials used in such compositions. Further, it will inhibit caries formation without damaging the tooth structure, as by causing surface and/or subsurface decalcification.

It is therefore an object of this invention to provide oral compositions for caries prophylaxis having improved effectiveness.

It is a further object of this invention to provide oral compositions for caries prophylaxis which do not cause adverse changes in the tooth structure.

It is a still further object of this invention to provide oral compositions for caries prophylaxis which are compatible with a wide variety of flavoring materials and other additives.

It has now been found that these and other objects can be attained with oral compositions containing certain N-alkylol quaternary ammonium fluorides and an acidifying agent to maintain a pH within the range from about 4 to 6 while the composition is in contact with the teeth.

The preferred N-alkylol quaternary ammonium fluoride compounds for the purpose of this invention include methyltriethanol ammonium fluoride, dimethyl-diethanol ammonium fluoride, and trimethylethanol ammonium fluoride. Methyltriethanol ammonium fluoride is especially preferred.

The N-alkylol quaternary ammonium fluorides can be used in varying concentrations in the compositions of this invention. For example, if the composition is of the type ordinarily applied by a dentist, such as an aqueous topical solution or prophylaxis paste, concentrations of the N-alkylol ammonium fluorides sufficient to provide from about 100 p.p.m. to about 7500 p.p.m. of fluoride ion can be used. In toothpaste, toothpowder, mouthwash, and the like, the concentration should be sufficient to provide from about 100 p.p.m. to about 4000 p.p.m. of fluoride ion. Preferably the fluoride compounds will be present in an amount sufficient to provide from about 500 to 2000 parts of fluoride ion per million parts of the total composition, in products intended for frequent use by the consumer.

The pH of the compositions of this invention must be within the range from about 4 to 6 while in contact with the teeth. Above about pH 6.0 these compositions do not provide the desired protection of the dental enamel from decalcification by acids. Below about pH 4.0 the surface of treated teeth is altered. Preferably the pH of the compositions will be maintained within the range from about 4.5 to 5.5 throughout usage. Acidifying agents which are suitable for use in the oral cavity can be added to the composition to adjust and maintain the pH within the desired range. Acidifying agents which are suitable for use in this invention include, for example, acetic acid-sodium acetate, gluconic acid-sodium gluconate, citric acid-sodium citrate, sodium or potassium dihydrogen phosphate and hydrochloric acid. The quantity of acidifying agents to be employed will, of course, vary with the relative strength and buffering capacity of the agent.

Representative compounds suitable for use in the compositions of this invention were prepared as follows:

EXAMPLE I

Triethanol amine (1000 grams) was dissolved in 1600 ml. of acetone in a three-necked 5 liter flask. Methyl iodide (1000 gms.) was added slowly and the mixture was refluxed for 3 hours. The products, methyltriethanol ammonium iodide, separated as a viscous oil and was purified by washing three times in acetone. The last of the acetone was removed by vacuum and the methyltriethanol ammonium iodide was converted to the fluoride by passing a 25% aqueous solution of the iodide over the hydroxide form of Amberlite IRA-400 (an ion exchange resin sold by the Rohm and Haas Co., Philadelphia, Pennsylvania), and adding HF to the effluent methyltriethanol ammonium hydroxide until a pH of 7.0 was reached. The resulting product was methyltriethanol ammonium fluoride.

EXAMPLE II 1,1′,1″-nitrilotri-2-propanol (321 gms.) is dissolved in 400 ml. of acetone as in Example I. 250 gms. of methyliodide are added slowly and then the mix is refluxed for 4 hours. The product, methyltri(2-hydroxy-n-propanol) ammonium iodide, separates as a viscous oil and is purified as in Example I. The fluoride salt is also formed as in Example I. The product is methyltri-n-propanol ammonium fluoride.

The anticariogenic activity of the compositions of this invention was determined as follows:

Several animal caries experiments were run on methyltriethanol ammonium fluoride in a topical solution (Example III) and in two toothpaste formulations (Example IV diluted four-fold with water and Example V diluted three-fold with water) to determine the effect of these compositions on the incidence of caries in rats. These tests were carried out in the following manner:

The compositions to be tested were applied to the teeth of weanling Wistar strain rats with a small cotton swab. The animals were housed individually and were placed immediately on a fine particle cariogenic diet comprised of 32% nonfat dry milk, 63% sucrose, 2% dried liver extract, and 3% celluflour. Water and food were administered ad libitum through the course of the experiment. The test compositions were assigned at random to one male and one female member of each of ten litters, such that possible variation among litters and between sexes could be discounted in evaluation of results. The test and control materials were topically applied once a day for 30 to 35 days. At the end of the treatment periods, all animals were sacrificed with chloroform and their oral cavities were filled with 2% $AgNO_3$ to stain the carious lesions. The animals were then autoclaved to obtain the clean, stained, teeth and jaw bone. The teeth were sectioned and examined microscopically and the individual carious lesions were graded using the method of Marthaller et al., "Planning and Evaluating Studies on Experimentally Produced Caries in Rats," Schweiz. Monatsschr. Zahnheilk., 67, 755–776 (1957). At the conclusion of the experiment, the number of lesions and severity score for each group were averaged and a percent reduction in caries based on the controls was calculated. The concentration of active agents, the concentration of the acetic acid-sodium acetate acidifying agent, and percent reduction in caries scores are set forth in Table I below.

*Table I*

| Composition (pH 5.0) | Fluoride (p.p.m.) | Total Acetate (Molal) | Reduction in Caries (Percent) |
|---|---|---|---|
| Example III—Methyltriethanol ammonium fluoride ($H_2O$ solution) | 500 | 0.004 | 31 |
| Example IV—Methyltriethanol ammonium fluoride paste A293 [1] | 500 | 0.04 | 35 |
| Example V—Methyltriethanol ammonium fluoride paste 5447 [2] | 667 | 0.034 | 46 |
| $SnF_2$($H_2O$ solution at pH 3.5) | 500 | | 22 |

[1] The composition of toothpaste A293 was as follows:

```
                                                      Concentration,
                                                         percent by
                                                            weight
Abrasive (precipitated melamineformaldehyde condensate)_ 34.97
Methyltriethanol ammonium fluoride_____  1.93
Acetic acid_____  1.03
Glycerine_____ 30.00
Hydroxyethylcellulose_____  2.00
Sodium hydroxide_____  0.23
Saccharin_____  0.15
Flavoring_____  0.80
Water_____ Balance
```

[2] The composition of toothpaste 5447 was as follows:

```
                                                      Concentration,
                                                         percent by
                                                            weight
Abrasive (Same as Example IV)_____ 34.19
Methyltriethanol ammonium fluoride_____  1.93
Acetic acid (glacial)_____  0.60
Sodium acetate_____  0.20
Glycerine_____ 30.00
Hydroxyethylcellulose_____  1.5
Coloring_____  0.60
Saccharin_____  0.18
Flavoring_____  0.80
Water_____ Balance
```

It can be seen that water solutions and toothpaste formulations containing methyltriethanol ammonium fluoride in a quantity sufficient to provide 500 p.p.m. of fluorine produces a substantial reduction in caries formation. Similar anticaries effect can be shown for the other compounds encompassed by this invention when tested in like manner. For example, the methyltriethanol ammonium fluoride used in the oral compositions of Examples III, IV, and V can be replaced with dimethyldiethanol ammonium fluoride, trimethylethanol ammonium fluoride, etc., and substantial anticaries effect will be shown. The reduction effected by $SnF_2$ adjusted to optimum pH and under the same test conditions is set forth in the above table for comparative purposes.

The biological effectiveness of compositions containing the N-alkylol quaternary ammonium fluorides was further established by agar-saliva tests which were carried out as follows:

Sound extracted teeth from adults in the Cincinnati, Ohio, area were stored in 5% aqueous formaldehyde solution at neutrality. Prior to use in these tests, the teeth were cleaned with fine grade pumice, dipped in 2 N hydrochloric acid for three seconds, and then were pumiced again to completely remove any natural or acquired organic film on the surface of the teeth. The teeth were then used whole or cut into quadrants (each molar providing four enamel faces) and were mounted on ¼ inch plastic rods. The cementum area and the cut surfaces of the quadrants were covered with wax to prevent reaction and retention of the test solutions on any surface but the enamel. Except as otherwise indicated, all teeth were treated by immersing them for 20 minutes in the stirred treating solution. Following treatment in each case the teeth were rinsed and then immersed in distilled water in separate containers and so stored until placed in the caries inducing medium, usually a maximum of one hour after treatment.

An agar medium prepared by mixing 6% Bacto-Tomato Juice Agar and 5% Bacto-Dextrose (Difco Labs., Chicago, Ill.), in water, was employed as a decalcifying environment. The mixture was placed in tubes and allowed to solidify. Each tooth or quadrant of molar was used to punch a hole in the agar and 1 ml. of fresh pooled saliva from at least two donors was pipetted into the hole. The tooth was then replaced in the hole so as to make good contact between the tooth, agar and saliva. The tube containing the agar and imbedded tooth was then placed in a closed container partly filled with water for humidifying purposes, and this was placed in a constant temperature box at 37° C. The 100% relative humidity in the container prevented the agar and saliva from drying.

Decalcification of the treated teeth was quantitively estimated by visual examination by two graders who appraised the area of the surface which had decalcified (formed white spots), estimating this area to the nearest 10%. The value for the tooth as a whole was obtained by averaging the figures for the individual surfaces. Decalcification was also measured by photographing the treated teeth while irradiated with ultraviolet light. The decalcified area of the tooth fluoresces at a lower intensity than the intact portion and estimates of the area of involvement are determined from the film record. To determine the degree of protection afforded by the test compositions the percent area of the tooth decalcified in the treated and untreated control tooth were compared.

Teeth were treated once per day with the test compositions containing 500 p.p.m. fluoride and adjusted to a pH of 5.0 with hydrochloric acid. There were a total of five treatments in five days. Table II below sets forth the percent area of tooth decalcification when the teeth were treated with the indicated compounds. The results with stannous fluoride and a water blank are included for purposes of comparison.

Table II

| Compound: | Area of tooth decalcified, percent |
|---|---|
| Example VI — Trimethylethanol ammonium fluoride | 10 |
| Example VII—Dimethyldiethanol ammonium fluoride | 11 |
| Example VIII — Methyltriethanol ammonium fluoride | 14 |
| Toothpaste of Example V | 10 |
| $SnF_2$ | 20 |
| Water, blank | 75 |

Another outstanding advantage of the compositions of this invention is their ability to form a continuous layer of very small, well dispersed, amorphous calcium fluoride particles which protects the teeth from acid demineralization and, in addition, prevents sub-surface decalcification in the course of treatment.

The effect of treatment with the compositions of this invention on the tooth surface is determined by measuring reflectance of the polished enamel surface, both before and after treatment. If surface changes occur in the course of treatment, the reflectance of the surface will diminish. Conversely, if no surface changes occur in treatment the reflectance of the dental enamel surface will be the same before and after treatment.

Reflectance of the tooth surface was determined as follows:

A beam of light from an 18 watt incandescent lamp is projected through a blackened right angle tube, onto the surface of a flat chip of the tooth under examination. The chip is placed at the axis of the tube and is oriented with respect to the light beam at a 45° angle. The intensity of the directly reflected light is measured with a light meter in meter candles.

Table III sets forth the reflectance values before and after treatment with aqueous solutions of the designated compounds adjusted to pH 5.0 with hydrochloric acid for periods of 20 minutes and two hours.

Table III

| Compound | Concentration, p.p.m. F | Time of Treatment | Reflectance Before Treatment | Reflectance After Treatment |
|---|---|---|---|---|
| Example IX—Dimethyldiethanol ammonium fluoride | 1,000 | 20 min | 320 | 320 |
| Example X—Dimethydiethanol ammonium fluoride | 1,000 | 2 hrs | 240 | 240 |
| Example XI—Trimethylethanol ammonium fluoride | 1,000 | 20 min | 220 | 220 |
| Example XII—Trimethylethanol ammonium fluoride | 1,000 | 2 hrs | 240 | 240 |
| Example XIII—Methyltriethanol ammonium fluoride | 1,000 | 20 min | 300 | 300 |
| Example XIV—Methyltriethanol ammonium fluoride | 1,000 | 2 hrs | 220 | 190 |
| NaF | 1,000 | 10 min | 450 | 230 |
| NaF | 1,000 | 30 min | 160 | 80 |

The difference in reflectance values resulting from treatment in sodium fluoride (included here for comparative purposes) indicates marked alteration of the enamel surface. Electron microscopic techniques reveal the presence of large calcium fluoride crystals on the surface of tooth.

Dentifrice compositions containing the N-alkylol quaternary ammonium fluorides constitute a preferred embodiment of this invention and may contain the usual dentifrice components. For example, resinous abrasive materials including particulate condensation products of melamine and urea or formaldehyde and the like which do not form insoluble salts with fluoride ion or inactivate fluoride ions by adsorption can be used to advantage. Other abrasives which have proven practical in fluoride containing dentifrice compositions and which can be used herein include calcium pyrophosphate, insoluble metaphosphates and alumina.

Toothpastes require a binder substance to impart desired texture properties. Natural gum binders such as gum tragacanth, gum karaya, gum arabic, etc. and seaweed derivatives such as Irish moss and alginates, and water soluble cellulose derivatives, such as hydroxyethylcellulose and sodium carboxymethyl cellulose can be used for this purpose. Desirably those materials are employed which are most compatible with fluoride ion. Binders which have no ionic groups, such as hydroxyethyl cellulose are especially preferred. Improvements in texture can also be attained by including an additional material such as colloidal magnesium aluminum silicate.

Toothpastes conventionally contain sudsing agents. Suitable sudsing agents include, but are not limited to, water-soluble alkyl sulfates having from 8 to 18 carbon atoms in the alkyl radical, such as sodium lauryl sulfate, water-soluble salts of sulfonated monoglycerides of fatty acids having from 10 to 18 carbon atoms in the alkyl radical, such as sodium coconut monoglyceride sulfonate, salts of fatty acid amides of taurines such as sodium-N-methyl palmitoyl tauride, and salts of fatty acid esters of isethionic acid.

It is also desirable to include some humectant material in a toothpaste to keep it from hardening. Materials commonly used for this purpose include glycerine, sorbitol and other polyhydric alcohols.

Flavoring materials may be included in toothpaste formulations including small amounts of oils of wintergreen and peppermint and sweetening agents such as saccharine, dextrose and levulose.

The dentifrice compositions of this invention will preferably contain a quantity of an N-alkylol quaternary ammonium fluoride sufficient to provide at least about 100 p.p.m. fluoride ions but not more than 4000 p.p.m. total fluorine.

EXAMPLE XV

A toothpaste suitable for use in caries prophylaxis is prepared having the following formulation:

| | Percent by weight |
|---|---|
| Abrasive (particulate melamine-formaldehyde resin) | 30.0 |
| Sodium lauryl sulfate | 1.51 |
| Glycerine | 10.00 |
| Sorbitol | 20.00 |
| Hydroxyethylcellulose | 1.10 |
| Magnesium aluminum silicate | 0.40 |
| Methyltri-n-propanol ammonium fluoride | 2.6 |
| Saccharine | 0.12 |
| Oil of peppermint | 0.85 |
| Coloring | 0.47 |
| Water | Balance |

Hydrochloric acid to pH 4.8.

This toothpaste effects a substantial reduction in dental caries under ordinary conditions of usage. Sustained application of this toothpaste via normal usage produces no adverse changes in the tooth structure.

In addition, each of the non-fluoride components can be replaced with their hereinebfore described equivalents without loss of the essential characteristics of the toothpaste. The flavoring material, i.e., oil of peppermint, may be replaced with any other flavoring material commonly used in dentifrice formulation, for example.

EXAMPLE XVI

A tooth powder embodying the invention is formulated as follows:

| | Percent |
|---|---|
| Calcium pyrophosphate | 95.50 |
| Sodium lauryl sulfate | 1.00 |
| Dimethyldiethanol ammonium fluoride | [1].80 |
| Secondary sodium citrate | 1.0 |
| Flavoring | 1.45 |
| Saccharine | 0.25 |

[1] Corresponds to 1000 p.p.m. F.

This formulation is effective in caries prophylaxis, has good consumer qualities and remains active for long periods of time. No adverse changes in the tooth structure are observed even after long periods of contact with this formulation. The pH of the formulation remains within the range from about 5 to 6 while in the oral cavity.

Trimethylethanol ammonium fluoride can be used in this tooth powder in place of dimethyldiethanol ammonium fluoride on an equimolar basis with substantially equal results.

Although the foregoing exemplifications of oral compositions for caries prophylaxis are directed to products which are ordinarily used in the home, it is to be understood that compositions which are usually applied by the dentist may constitute embodiments of this invention. For example, dental prophylaxis pastes containing the usual pumice and flavoring components can be formulated to contain, in addition to these materials, 7.2% of methyltriethanol ammonium fluoride, while adjusting the pH of the composition to 5.0 with citric acid and sodium citrate. Such a composition employed in the usual manner by the dentist is of exceptional value in caries prophylaxis.

Aqueous solutions of the N-alkylol ammonium fluorides of this invention, adjusted to a pH within the range between 4 and 6 with any of the hereinbefore disclosed acidifying agents to be topically applied to the teeth by the dentists constitutes another efficacious composition for caries prophylaxis. Such compositions may also contain flavoring materials and the like. The concentration of the N-alkylol quaternary ammonium compound in such compositions will preferably be within the range from about 0.14% to 7.0%.

It is understood that the compositions of this invention may contain in addition to the usual components of such formulations, functional adjuvants such as antibacterial, deodorizing and medicinal agents.

What is claimed is:

1. An oral composition for caries prophylaxis comprising at least one N-alkylol quaternary ammonium fluoride selected from the group consisting of methyltriethanol ammonium fluoride, dimethyldiethanol ammonium fluoride, and trimethylethanol ammonium fluoride, in a quantity sufficient to provide from about 100 parts to about 7500 parts of fluorine per million parts of the total composition, and a carrier suitable for use in the oral cavity, the pH of said composition being within the range from about 4 to 6 in aqueous solution.

2. The composition of claim 1 wherein the N-alkylol quaternary ammonium fluoride is dimethyldiethanol ammonium fluoride.

3. The composition of claim 1 wherein the N-alkylol quaternary ammonium fluoride is trimethylethanol ammonium fluoride.

4. The composition of claim 1 wherein the N-alkylol quarternary ammonium fluoride is methyltriethanol ammonium fluoride.

5. A dentifrice composition comprising a quantity of methyltriethanol ammonium fluoride sufficient to provide from about 100 parts to about 4000 parts of fluorine per million parts of the total composition, and a fluoride-compatible abrasive material, the pH of said composition being within the range from about 4 to 6 in aqueous solution.

References Cited by the Examiner

UNITED STATES PATENTS

| 2,692,264 | 10/1954 | Wojcik | 167—93 |
| 3,124,512 | 3/1964 | Schmid et al. | 167—93 |

FOREIGN PATENTS

| 167,045 | 2/1956 | Australia. |
| 1,092,657 | 11/1954 | France. |
| 865,272 | 4/1961 | Great Britain. |

LEWIS GOTTS, *Primary Examiner.*

FRANK CACCIAPAGLIA, JR., *Examiner.*